Figure 1:
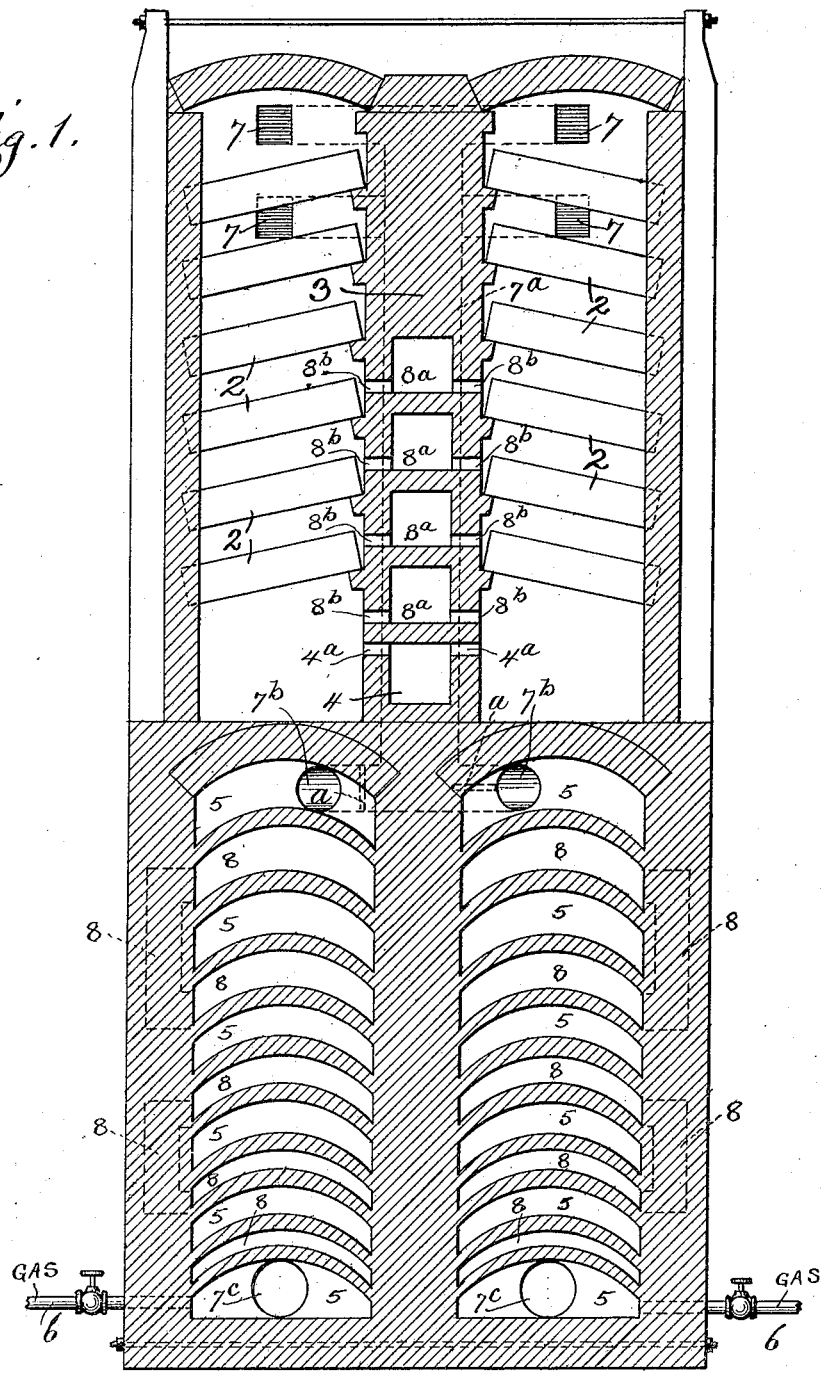

No. 887,194. PATENTED MAY 12, 1908.
N. L. HEINZ.
REGENERATIVE FURNACE.
APPLICATION FILED FEB. 11, 1907.

3 SHEETS—SHEET 1.

Witnesses:

Inventor:
Nicholas L. Heinz
By Scott H. Whipple
Atty.

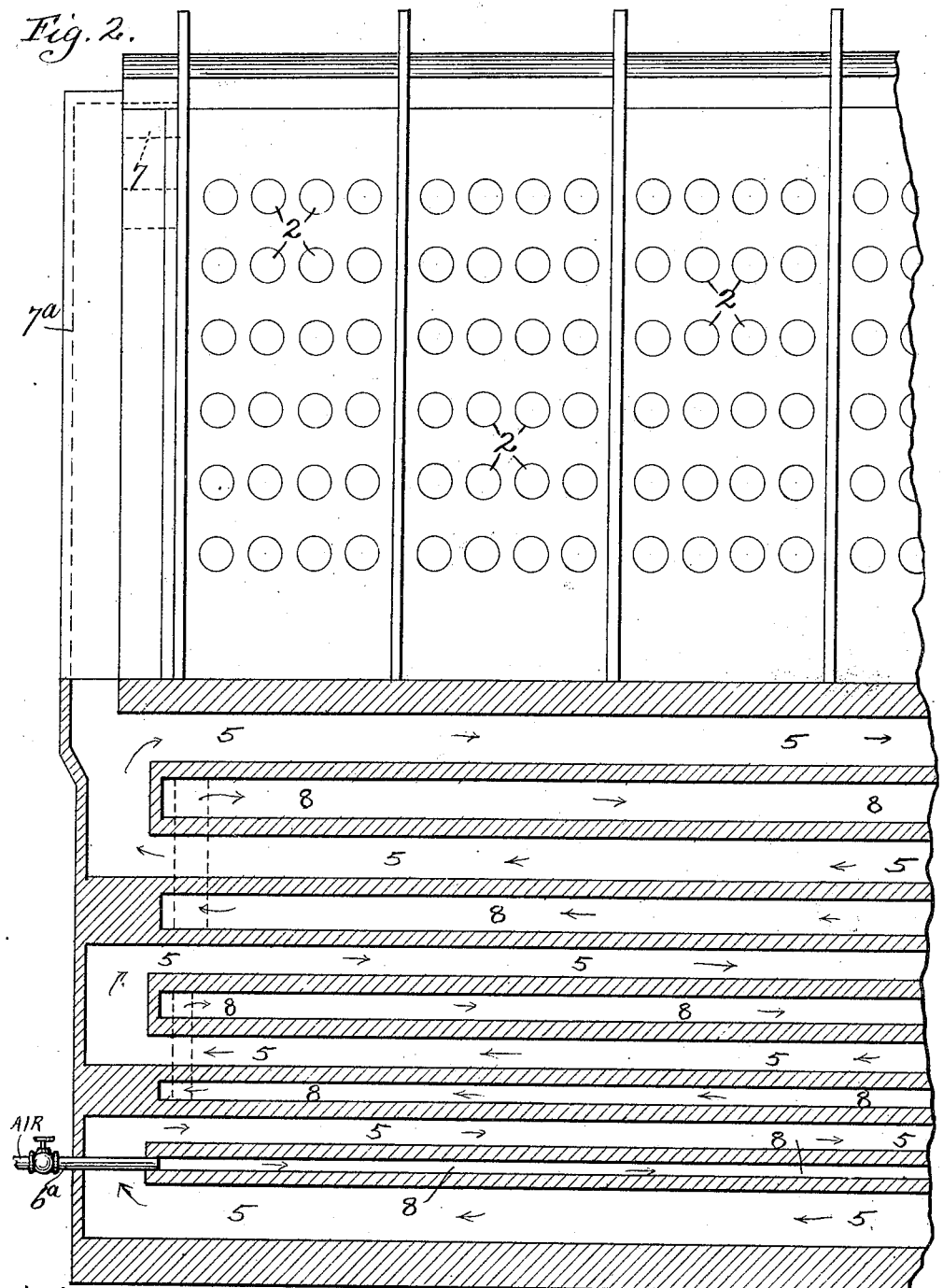

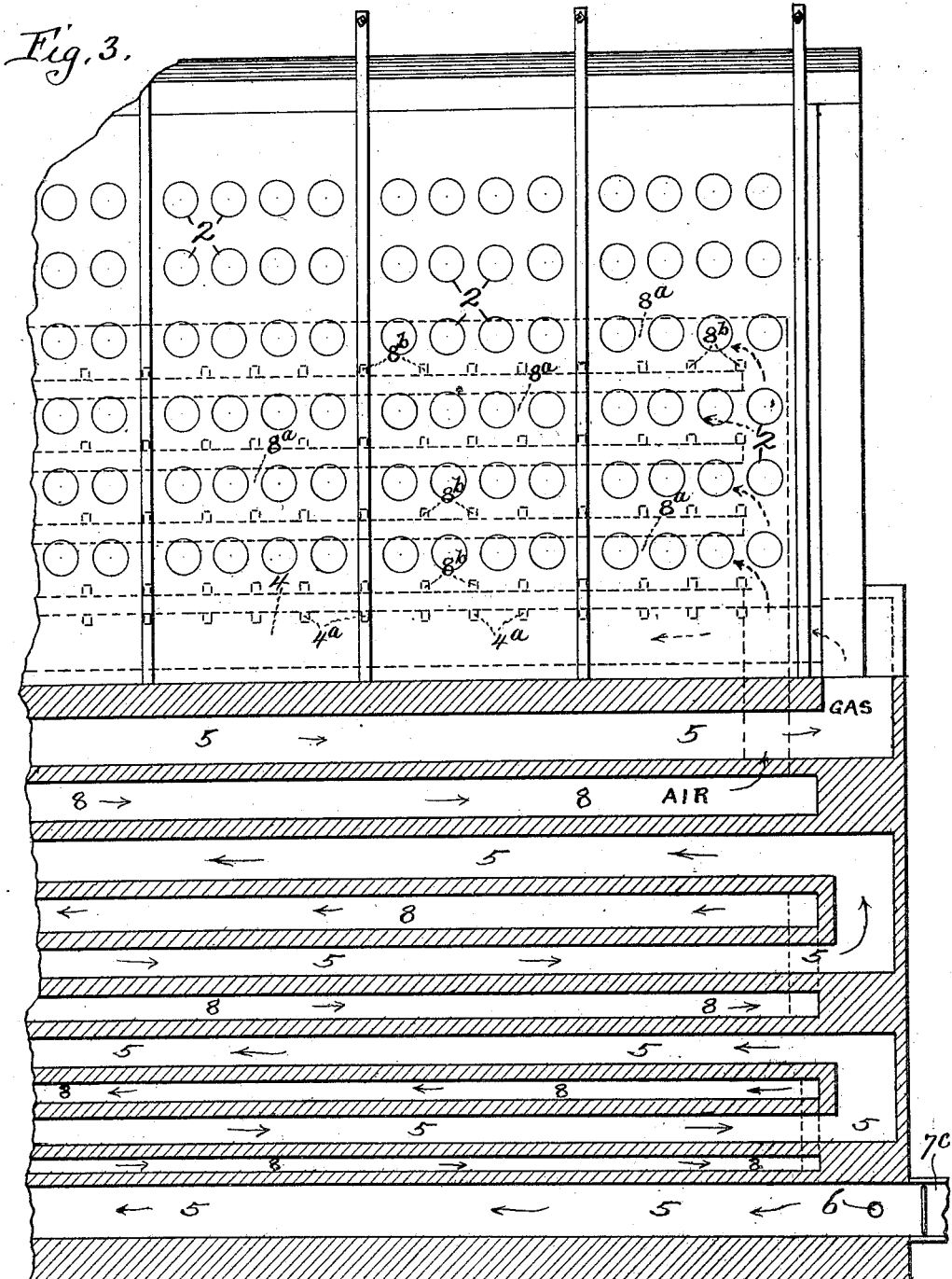

UNITED STATES PATENT OFFICE.

NICHOLAS L. HEINZ, OF LA SALLE, ILLINOIS.

REGENERATIVE FURNACE.

No. 887,194.  Specification of Letters Patent.  Patented May 12, 1908.

Application filed February 11, 1907. Serial No. 356,693.

*To all whom it may concern:*

Be it known that I, NICHOLAS L. HEINZ, of La Salle, in the county of Lasalle and State of Illinois, have invented certain new and useful Improvements in Regenerative Furnaces, of which the following is a specification.

My invention relates to regenerative retort furnaces for zinc smelting.

The objects of the improvement are: first, to provide regenerative furnaces in conjunction with a retort chamber or chambers, whereby the escaping products of combustion from the retort chambers shall be applied alternately to the regenerators through which the incoming air and gas are passing on toward the retort chamber for heating the same before entering the chamber and mixing in combustion for heating the retorts; second, to provide a construction of regenerative furnace which will afford a more free passage of air and gas in the same than heretofore; and third, to provide a valved flue connection of the regenerators with the retort chamber whereby the currents of ingoing air and gas and outgoing products of combustion may be reversed in the regenerators but not in the retort or working chamber. I attain these objects by the construction of furnace and regenerators illustrated in the accompanying drawings in which,—

Figure 1 is a transverse vertical section through a furnace of the class mentioned containing my invention. Figs. 2 and 3 are fragmentary views showing respectively, portions of the opposite ends of the furnace, partly in side elevation, and partly in longitudinal section.

Similar reference signs refer to similar parts throughout the several views.

Referring to Fig. 1, a pair of regenerators is shown as located beneath a retort chamber which is divided by a central wall. The construction of the chamber and the arrangement of the retorts 2 are of the ordinary kinds, and the chamber may be of any desired length. At the bottom of the chamber the central division wall 3 is provided with a large gas flue 4 which has numerous openings 4ª communicating at intervals with the space at the bottom of the chamber below the retorts.

Gas flues 5 are alternated back and forth in the regenerators and communicate with the gas flue 4 of the retort chamber, as shown in Fig. 3, so that the fire gases, introduced into either regenerator through a valved flue 6 (Fig. 1) from any outside source of supply, after passing through the flue 5 of such regenerators, will enter the gas flue 4 and from thence pass through the openings 4ª into the retort chamber below the retorts on both sides of the central division wall, along the full length of the chamber, and thence up and around the retorts. At each side of the central division wall and near the top of the chamber, is a branch flue 7 leading to a main flue 7ª, through which the products of combustion pass out of the retort chambers. The flue 7ª is branched at its lower end so as to communicate as at 7ᵇ with the gas flues 5 of both the regenerators at the top as shown in Fig. 2, valves *a* (dotted lines Fig. 1) being provided in the branches whereby the entire products of combustion from both retort chambers may be turned into either of the regenerators, and after passing through the flue 5 thereof, pass out through a valved exit flue 7ᶜ (Fig. 3) leading to a chimney not shown.

The regenerators are provided with alternating air flues 8, in which air introduced into either of the regenerators through a valved pipe 6ª (Fig. 2) is passed back and forth through such regenerator and delivered into one or more air flues 8ª in the division wall of the retort chamber, which have numerous openings 8ᵇ through which air is delivered into the retort chamber and is mixed therein with the fire gases in combustion. By this construction, air and gas, respectively, passed into either of the regenerators at the bottom, or point opposite to the junction of the regenerators with the retort chamber, will be passed through the respective individual air and gas flues thereof into the retort chamber and be mixed and burned therein, and by an obvious manipulation of the valves *a* of the flues 7ᵇ the products of combustion can be made to pass out through the other regenerator for the purposes of heating it so that it may serve for a time and until cooled for heating the ingoing air and fire gases made to pass through it into the retort chamber.

The fire gases may be passed in through one of the regenerators while the air is passing through the other and in such case the products of combustion can be passed out through either of the regenerators so as to heat either the ingoing gas or air as desired.

Thus the ingoing air only may be heated while using hot gas from the producer introduced into the working chamber through flue 4. Also the products of combustion may pass out continuously through flue 5 and the ingoing air continuously through the flue 8 of the same regenerator without reversing, in which it will be unnecessary to use reversing valves in any of the flues. The individual gas flues and air flues are preferably so arranged in the regenerators that the gases and air passing in the regenerators shall move in opposite directions as indicated by the arrows shown on the drawings (Figs. 2 & 3). This result is attained by having said individual flues alternate with one another, as first a gas flue and then an air flue, and have the induction flues 6 and 6ª for gas and air arranged to enter the gas and air at opposite points of the regenerators, as seen in Figs. 2 and 3.

The principle of the invention is embodied in the structure and arrangement of parts illustrated, whereby the air and gases are made to enter either one of the regenerators at the bottom, or at a point opposite to the point or line of the junction of the regenerators with the retort chamber, and pass separately in meandering courses through such regenerator and therefrom into the chamber at the bottom or point near said junction, that the products of combustion shall pass out of the combustion chamber at the top or point further from such junction, and be conducted back and made to pass into the other regenerator at its top or point adjacent to said junction and then pass in a meandering coarse through to the bottom or point of such regenerator further from said junction to be discharged after its heat is largely spent.

It is noted that the air flues in the regenerators as illustrated, are made smaller at the entrance or bottom and gradually increase in size as they approach the top. The purpose of this preferred construction is to slow the movement of the air as it approaches the retort chamber in order to increase the temperature to the highest practical degree before it reaches the retort chamber. This also lessens the friction or resistance to the movement of the air in the regenerators.

With this construction of zinc smelting furnace, a very long horizontal furnace may be made of any practical height, wherein the air and fire gases are introduced into the combustion chamber at intervals along the bottom and the products of combustion pass out at the top, and the tendency of the hot air and gas to rise in the retort chamber is made available to overcome the resistance offered by the retorts to the passage of the fire gases through the chamber, as when this is done in long horizontal furnaces, wherein the gas and air move in a horizontal direction through them. The advantages of a long horizontal furnace as in being more accessible for working purposes and having less resistance to the vertical passage of the gases through the same, are thus made more available. Also a more uniform temperature is attained than with other types of regenerative furnaces.

It is contemplated that the introduction of the air and the fire gases may be reversed, that is, the gases may be introduced into the regenerators through the flues 8 described as air flues and the air through the gas flues 5, but the manner first described is preferred.

The invention is not limited to the use of a divided retort chamber, nor to the use of a chamber in which retorts are employed as in zinc smelting, for it is obvious the principal and described means of reversing the direction of the ingoing and the outgoing currents in the regenerators while maintaining in the chambers a uniform current in one direction are applicable in an undivided working chamber or one designed for other purposes than zinc smelting.

What I claim and desire to secure by Letters Patent is:

1. In a furnace of the class mentioned, a combustion chamber having a gas flue and an air flue extended horizontally therein and provided with ports emptying into the chamber near the bottom, in combination with the regenerators beneath the chamber and provided with air flues and gas flues alternating back and forth therein and communicating respectively with the gas and air flues of the chamber, a valved flue communicating with the chamber space at the top and with the regenerator gas flues at the top of the regenerators, and valved exit flues communicating with the gas flues at the bottom of the regenerators.

2. In a furnace of the class mentioned, a retort chamber provided with a central division wall having a gas flue and an air flue extended horizontally therein near the bottom and provided with ports communicating with the chamber at opposite sides of said wall, in combination with regenerators having gas flues and air flues, respectively, communicating with the gas flue and the air flue of the chamber, a branched valved flue communicating with the chamber at the top and with the regenerator gas flues at the top of the regenerators and a branched, valved exit flue communicating with the gas flues at the bottom of the regenerators.

3. In a furnace of the class mentioned, the combustion chamber in combination with a set of flues provided with ports communicating with one part of the chamber space, a set of regenerators in conjunction with the chamber, sets of flues in the regenerators communicating with the sets of horizontal flues of the chamber, a branched, valved flue connecting the opposite part of the chamber with one end of the sets of the flues of the regenerators, and a branched, valved exit flue connected with the other end of the sets of flues of the regenerators.

4. In a furnace of the class mentioned, the combustion chamber provided with horizontal flues near its bottom, having ports at intervals in combination with a regenerator placed beneath the combustion chamber and provided with alternating individual flues communicating respectively with the horizontal flues of the combustion chamber, and a flue connecting the top of the combustion chamber space with upper part of one of the alternating flues of the regenerator.

5. In a furnace of the class mentioned, the combustion chamber provided with horizontal flues near the bottom and having ports at intervals, in combination with a regenerator placed beneath the combustion chamber and having alternating individual flues communicating with the horizontal flues of the combustion chamber and provided with induction flues respectively entering the regenerator flues at opposite points, and a flue connecting the top of the combustion chamber with the upper part of one of the alternating flues of the regenerator.

6. In a furnace of the class mentioned, the combustion chamber having a central division wall provided with horizontal individual flues near the bottom of the chamber, having ports communicating with the chamber space near the bottom on both sides of the division wall, in combination with gas and air induction flues, respectively, communicating with said horizontal flues and with outer sources of supply of gas and air.

7. In a furnace of the class mentioned, the combustion chamber having a central division wall, provided with horizontal individual flues near the bottom, having ports communicating with the chamber space near the bottom at intervals, in combination with regenerators placed beneath the combustion chambers, individual flues of the regenerators communicating with said horizontal flues, and valved flues communicating with the chamber space at the top and with the regenerator flues at the top of the regenerators.

8. In a furnace of the class mentioned, the combustion chamber and regenerators in combination with individual alternating flues in the regenerators, one set of such flues being made tapering to increase in diameter from the point of induction into the regenerator toward the point of discharge into the combustion chamber.

NICHOLAS L. HEINZ.

Witnesses:
  WM. V. HEINZ,
  ROBT. C. WELTER.